W. H. SARTAIN.
APPARATUS FOR DISPOSING OF NOXIOUS GASES.
APPLICATION FILED APR. 10, 1909.
942,935.
Patented Dec. 14, 1909.
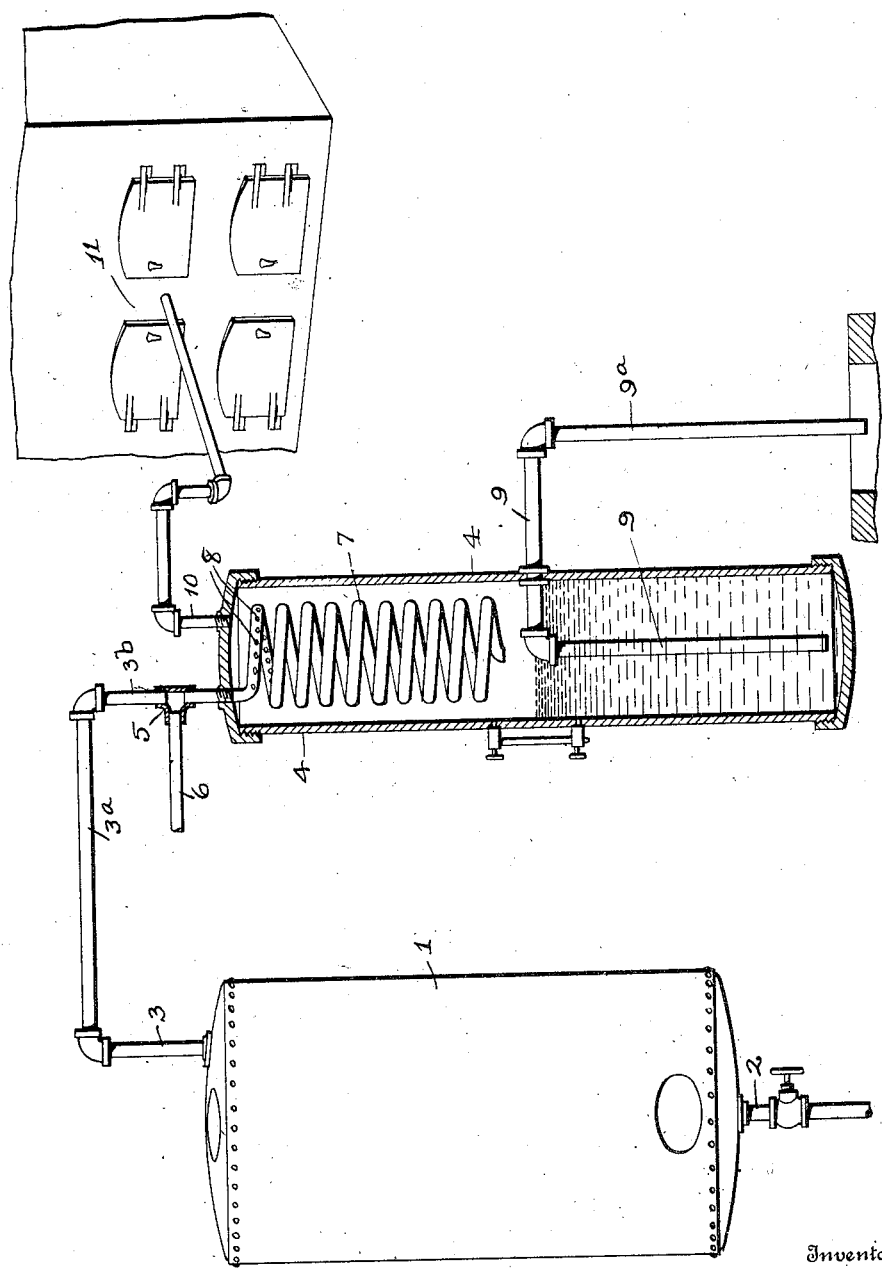
Witnesses
Carl Stoughton
A. L. Phelps
Inventor
William H. Sartain
By C. C. Shepherd
Attorney

UNITED STATES PATENT OFFICE.

WILLIAM H. SARTAIN, OF COLUMBUS, OHIO.

APPARATUS FOR DISPOSING OF NOXIOUS GASES.

942,935.　　　Specification of Letters Patent.　　Patented Dec. 14, 1909.

Application filed April 10, 1909. Serial No. 489,198.

*To all whom it may concern:*

Be it known that I, WILLIAM H. SARTAIN, a citizen of the United States, residing at Columbus, in the county of Franklin and State of Ohio, have invented certain new and useful Improvements in Apparatus for Disposing of Noxious Gases, of which the following is a specification.

My invention relates to apparatus for disposing of noxious gases incident to the rendering of lard or offal, and the objects of my invention are to provide comparatively simple and inexpensive means for removing noxious gases or vapors from a rendering tank; separating the gases from the steam and disposing of such gases without permitting the same to mingle with the atmosphere. These objects I accomplish in the manner illustrated in the accompanying drawing, in which is shown partly in section and partly in elevation, my improved means for treating and disposing of noxious gases.

It is a common expedient in packing houses and similar places to render lard or treat waste products, by placing the same in a closed receptacle known as a rendering tank, and subjecting the same to the cooking action of steam discharged into said tank from a boiler or other suitable source of steam supply. As a result of this treatment of the contents of the tank, noxious gases are formed which when permitted to escape to the atmosphere, create an extremely disagreeable odor in the neighborhood of the plant, which odors are at times carried to comparatively long distances from the tank. By the construction of the apparatus which I have provided, the gases generated in the rendering tank, are disposed of and the odor in the neighborhood of the tank, dispensed with entirely.

Referring to the drawing, 1 represents a suitable form of rendering tank, which is provided with a valve-controlled steam inlet pipe 2, preferably in its lower end portion, and an outlet pipe 3 in its upper end portion. The outlet pipe through the medium of pipe sections 3$^a$ and 3$^b$, leads through the upper end of a vertical tank or cylinder 4, which is disposed at a reasonable distance from the tank 1. Above the tank 4, the pipe section 3$^b$ is separated and the sections formed by such separation connected by a suitable form of T-coupling 5, into which leads a water supply pipe 6, which may run from any suitable source of water pressure. Within the upper portion of the tank 4, I suspend a coiled tube 7, the upper coil of which is provided with a plurality of perforations 8. The upper end of this coiled tube connects, as shown, with the lower end of the pipe 3$^b$. Leading upward from the lower end portion of the tank 4 and within said tank, is a pipe 9 which at about or near the center of the height of the tank 4, leads laterally outward through said tank, thence vertically downward through a pipe arm 9$^a$ to a sewer or other outlet. From the upper end of the tank 4, leads a gas pipe 10, which runs to and discharges within or immediately beneath the fire-box of a furnace 11.

As indicated in the drawing, the tank 4 is normally supplied with water, which rises to the height of the center of the horizontal member of the outlet pipe 9.

As a result of the rendering of lard, offal or other material within the tank 1, it is obvious that gas is generated in said tank and the mingled steam and gas finds an outlet through the pipe 3. Before reaching the tank 4, however, this mixture is subjected to the action of a comparatively small stream of cold water, which enters the pipe arm 3$^b$ through the pipe 6 and operates to condense the steam, thereby separating the gas from the steam. As will readily be understood, however, a certain per cent. of uncondensed mingled steam and gas, may pass into the upper portion of the tank 4, thence downward through the coil 7, the contact with which insures the completion of the condensation. The water from the condensation joins the body of water contained in the lower half of the tank, while the gas which is separated by the condensing operation, passes outward through the pipe 10 to the fire box of the furnace, where it is completely consumed. Any gas which may pass downward through the coil and which is only released from the volume of steam by contact with the comparatively cold water within the tank, may rise into said tank 4 and pass outward through the coil openings 8 and gas pipe 10.

Owing to the provision of the outlet pipe 9, it will be understood that the water in the tank 4, will be maintained at substantially the same level, inasmuch as said outlet pipe will serve to carry away the surplus water which may be directed therein, as a result of condensation of steam and the supply from the pipe 6.

By the means and operation described, it will readily be understood that a complete separation of the mingled gas and steam, is effected, and that the gas being consumed at the furnace, the atmosphere in the neighborhood of the rendering tank, will be free from contamination.

What I claim, is:

In an apparatus for the disposal of noxious gases, the combination with a rendering tank having a steam supply pipe, of a second water containing tank having an outlet pipe as described, a coiled tube within the upper portion of said second tank and having openings in its upper portion, a pipe connecting the upper end of the rendering tank and said second tank and connecting with said coiled tube, a water pipe leading into said connecting pipe, and a gas pipe leading from the upper end of said second tank to a fire containing structure.

In testimony whereof I affix my signature in presence of two witnesses.

WILLIAM H. SARTAIN.

Witnesses:
C. C. SHEPHERD,
L. CARL STOUGHTON.